United States Patent [19]
Van Alfen

[11] Patent Number: 5,355,358
[45] Date of Patent: Oct. 11, 1994

[54] DISC PLAYER WITH PUSH-AWAY DOOR FLAPS THAT CONTACT ONLY THE DISC EDGE

[75] Inventor: Maarten Van Alfen, Wetzlar, Fed. Rep. of Germany

[73] Assignee: U.S. Philips Corporation, New York, N.Y.

[21] Appl. No.: 65,714

[22] Filed: May 21, 1993

[30] Foreign Application Priority Data

May 26, 1992 [DE] Fed. Rep. of Germany ....... 4217397

[51] Int. Cl.$^5$ .............................................. G11B 17/04
[52] U.S. Cl. ................................................... 369/77.1
[58] Field of Search ........................... 369/77.1, 77.2; 360/99.02, 99.06; 16/281, 282

[56] References Cited

U.S. PATENT DOCUMENTS

| | | | |
|---|---|---|---|
| 4,510,591 | 4/1985 | Schatteman | 369/77.1 |
| 4,675,858 | 6/1987 | d'Arc | 369/77.1 |
| 5,229,987 | 7/1993 | Aoki | 369/77.1 |

Primary Examiner—Stuart S. Levy
Assistant Examiner—William R. Korzuch
Attorney, Agent, or Firm—David R. Treacy

[57] ABSTRACT

An electrical information apparatus comprising a drive mechanism for information carriers in the form of rotatable discs (15), particularly Compact Discs, having an operating space (21) which serves for playing the discs (15), into and out of which space the discs (15) can be moved through a slot (3) which bounds the operating space (21) towards the exterior and can be closed by movable shutter means, in which the shutter means (9a, 9b, 31) are constructed as push-away segments which are movable perpendicularly to the plane of the disc and to the longitudinal direction of the slot, the edges of the slot (3) and an actuating edge (9e) of the push-away segments cooperating in such a manner that, when the disc (15) passes the push-way segments, in essence always only the edge area of said disc comes into contact with the edge of the slot and the actuating edge of the push-away segments, which recede during passage.

18 Claims, 2 Drawing Sheets

US 5,355,358

DISC PLAYER WITH PUSH-AWAY DOOR FLAPS THAT CONTACT ONLY THE DISC EDGE

BACKGROUND OF THE INVENTION

The invention relates to an electrical information apparatus for scanning a rotatable information carrier having an information plane, which apparatus has an operating space for the disc, into and out of which space the disc is movable parallel to said information plane and through a slot bounding the operating space towards the exterior and having a longitudinal direction and a slot edge, which slot can be closed by movable shutter means.

Such an electrical information apparatus is known from EP 183 672 A2, to which U.S. Pat. No. 4,675,858 corresponds (herewith incorporated by reference). In said apparatus the shutter means for closing the slot comprise a rotatable element held in a predetermined rotary position by spring bias. The rotatable element has inclined surfaces via which the element is rotated against the spring bias so as to enable a disc to enter the operating space when the disc is inserted into the slot along its disc plane. As soon as the disc has passed the slot and the rotatable element this element is returned to its initial position and closes the slot. When the disc is subsequently slid out it abuts against another inclined surface of the rotatable element and rotates this element in such a manner that the disc can be moved out through the slot. When the disc has moved past the rotatable element the spring returns the element into its closed position.

When this construction is used the entire surface of the disc moves past the pivoted rotatable element. This may give rise to surface damage.

SUMMARY OF THE INVENTION

It is an object of the invention to provide an electrical information apparatus of the type defined in the opening paragraph, in which the slot can be closed by shutter means but the disc surface has no mechanical contact with the shutter means or other parts during the movement of the disc relative to the shutter means.

According to the invention this object is achieved in that the shutter means are constructed as push-away segments which are movable perpendicularly to the plane of the disc and to the longitudinal direction of the slot, the slot edge of the slot and an actuating edge of the push-away segments cooperating in such a manner that, when the disc passes the push-way segments, in essence always only the edge area of the disc comes into contact with the slot edge of the slot and the actuating edge of the push-away segments, which recede during passage that is, only the area of the disc surface adjacent the disc edge contacts the slot edge and the actuating edge. This promotes the desired edge contact.

The shutter means are then activated by the disc edge only. The shutter means do not contact other areas of the disc surface. Thus, damage to the disc is avoided despite the presence of a shutter means.

In a further embodiment of the invention at least the slot edge and an actuating edge, between which actuating edge and the slot edge a disc edge can be inserted, together exhibit a curved convex shape.

In a further embodiment of the invention the shutter means comprise swing-door type flaps which, viewed in the longitudinal direction of the slot, are pivotably supported at both sides of and outside the slot ends in such a manner that the edge portions of the disc, when they pass the slot during loading and unloading operations, can pivot said flaps between a position in which the slot is open and a position in which said slot is closed. The shutter means thus correspond to a two-part swing door which can be opened by pushing.

In a further embodiment of the invention the shutter means comprise a slide which is guided at least at both sides and outside the slot ends and which is movable transversely of the slot in such a manner the edge portions of the disc, when they pass the slot during loading and unloading operations, can move said slide between a position in which the slot is open and a position in which said slot is closed. The shutter means thus correspond to a push-away slide.

In a further embodiment of the invention the shutter means are spring-loaded in the closing direction. Thus, the closing means are moved only under the influence of the edge of the disc inserted through the slot.

In a further embodiment of the invention in the longitudinal direction the shutter means comprise actuating surfaces at the sides facing the slot, which surfaces converge to an actuating edge in order to achieve that disc edges push away the shutter means until they have come into contact with the actuating edge and, when the disc is moved further, only the actuating edges are still in contact with the disc edges and the shutter means are subsequently moved via the actuating edges. This ensures that the shutter means are pushed aside by discs inserted through the slot.

In a further embodiment of the invention the actuating edge of the slide is adapted to the downwardly curved shape of the lower edge of the slot between which edge and the actuating edges the disc edges are inserted. This ensures that the disc edges correctly engage with the actuating edges.

In a further embodiment of the invention the free ends of the flaps comprise means which interlock in the closed position. When a disc is inserted obliquely the two flaps are also actuated in order to prevent the disc surface from being damaged by one of the flaps.

In a further embodiment of the invention the shutter means are guided transversely of the plane of insertion of the discs in guideways in the front part of a drive mechanism or apparatus, in which part the slot has been provided. This ensures a reliable guidance of the flaps.

The invention will now be described in more detail, by way of example, with reference to the drawings. In the drawings:

DESCRIPTION OF THE PREFERRED EMBODIMENT

Figure 1:
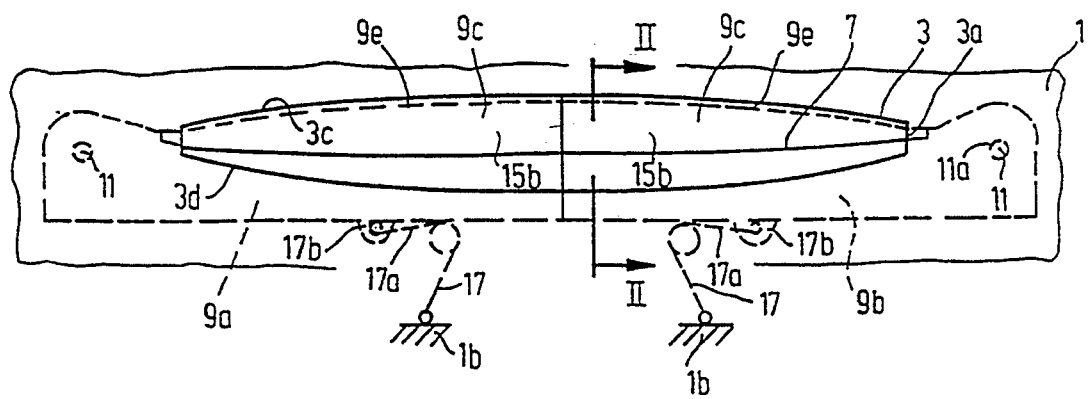
FIG. 1 shows the arrangement of shutter means in the form of flaps for closing a slot in the drive mechanism of an electrical information apparatus for information-carrier discs, no disc being situated in the slot and the shutter means being arranged behind a front wall which covers the shutter means.
Figure 2:
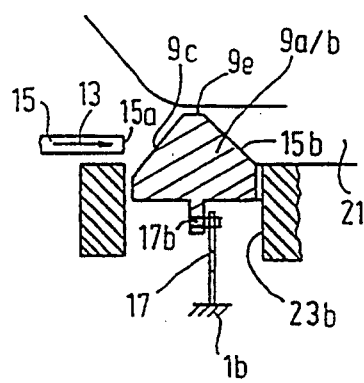
FIG. 2 is a sectional view taken on the line II—II in FIG. 1.

FIG. 1 shows a part of a front panel of an electrical information apparatus, for example in the form of a car radio suitable for mounting in a dashboard or console of a motor vehicle. The front panel is in fact larger and carries inter alia one or more control knobs. FIG. 1 shows only a part 1 of this front panel with a slot 3 through which an information-carrier disc, for example a Compact Disc, can be inserted into the operating space of a CD player. As long as there is no CD in the area 7 of the slot 3, this slot is closed by means of swing-door type flaps 9a, 9b. These swing-door type flaps are supported at two sides in pivots situated outside the slot ends 3a. The pivot 11a axes 11 extend perpendicularly to the plane of the drawing and in the direction of insertion 13 of a Compact Disc 15 (FIG. 2).

The flaps 9a and 9b and 9c have actuating surfaces adapted to cooperate with a disc edge 15a. Leg springs 17 urge the flaps 9a and 9b into the closed position shown in FIG. 1. For this purpose the leg springs each act have a leg 17a which acts upon a lug 17b of the respective flap 9a or 9b and at the apparatus side they bear against abutments 1b. If a Compact Disc 15 is inserted into the slot 3 in the direction indicated by the arrow 17 the disc edge 15a presses the flaps 9a and 9b downward against the spring pressure until it abuts against the actuating edge 9e.

The actuating edge 9e of the respective flap 9a or 9b is outwardly curved to match the curved convex shape of the upper edge 3c of the slot, as is shown in FIG. 1. The lower edge 3d of the slot also has a corresponding convex curvature.

As a result of the convex shape of the actuating edge 9e and the slot edge 3c only the edge 15a of a Compact Disc 15 will come into contact with the respective actuating edge 9e and the upper edge 3c of the slot when the disc is inserted. The other disc areas situated therebetween are not affected by the arrangement of the shutter means and their movement.

Figure 3:
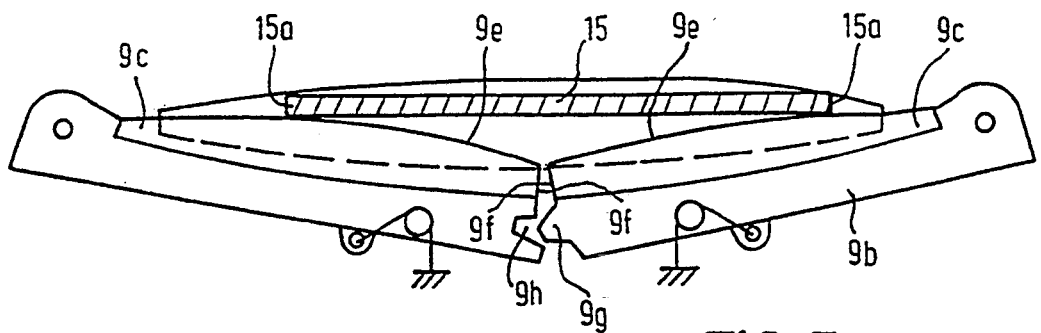
FIG. 3 shows the arrangement of FIG. 1 with a disc situated in the slot, which disc pushes the shutter means aside, the parts situated before the shutter means being removed to show the shutter means.

FIG. 3 shows clearly how the Compact Disc 15 pivots the flaps 9a and 9b via its edge 15a. When the disc has been inserted completely into the operating space 21 of the apparatus the springs 17 urge the flaps 9a, 9b back into the closed position shown in FIG. 1. When the CD is slid out it will press against the rear actuating surfaces 15b and urges the flaps 9a and 9b aside until the Compact Disc 15 has been slid out completely. Subsequently, the flaps 9a, 9b resume the closed position. The action of the springs 17 is degressive, i.e. their force is maximal when the flaps 9a, 9b are closed. This precludes rattling.

At their free ends 9f the flaps 9a and 9b have interlocking means comprising a tooth 9g and a recess 9h. When a disc is inserted obliquely the two flaps are also actuated in order to prevent the disc surface from being damaged by one of the flaps.

FIGS. 4 to 7 show another embodiment of the invention, in which the slot can be closed by means of a slide 31. This slide 31 is slidably mounted in grooves 32 situated at both sides of and outside the slot ends 3a. The grooves 32 extend parallel to the plane of the drawing.

The slide 31 has actuating surfaces 31a and 31b (FIG. 5) which at its front and back coverage to a crest forming an actuating edge 31c. The slide 31 is, for example, suspended from leaf springs shown 33 in FIG. 5. The leaf springs can bear on the apparatus housing 34 at the location of the front panel.

When a Compact Disc is inserted into the slot 3 in the direction indicated by an arrow 17 (FIGS. 6 and 7) the disc edge 15a will push the slide 31 downward against the spring pressure until the disc edge 15a moves over the actuating edge 31c.

Figure 4:
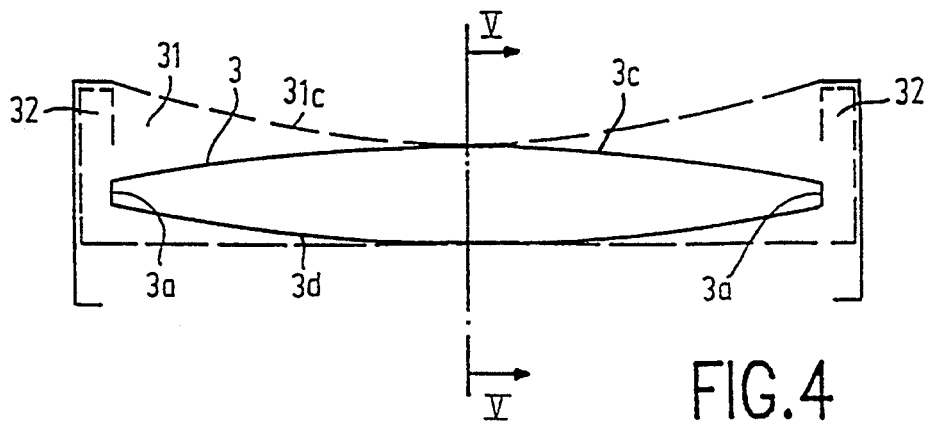
FIG. 4 shows the arrangement of shutter means in the form of a slide for closing a slot in the drive mechanism of an electrical information apparatus for information-carrier discs, no disc being situated in the slot and the shutter means being arranged behind a front wall which covers the shutter means, FIG. 5. is a sectional view taken on the line V—V in FIG. 4.
Figure 5:
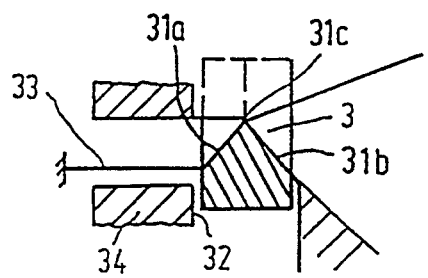
Figure 6:
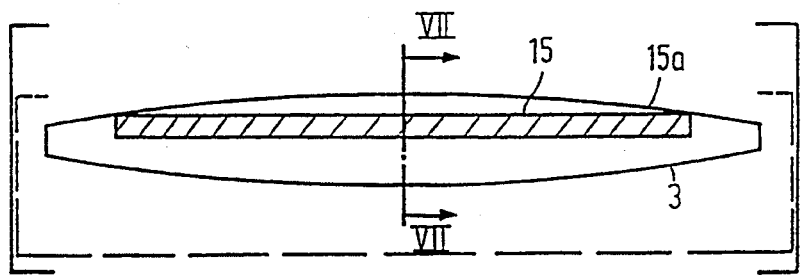
FIG. 6 shows the arrangement of FIG. 4 with a CD situated in the slot.

As is apparent in particular from FIGS. 4 and 6 the actuating edge 31c of the slide 31 has a downward curvature, which may correspond to the curvature of the lower edge 3d of the slot.

As a result of the arcuate shape of the actuating edge 31c and the upper edge 3c of the slot only the edge 15a of a Compact Disc 15 will come into contact with the respective actuating edge 31c when the disc is inserted. The disc area situated therebetween are not affected by the slide and its movement. This is clearly shown in FIG. 6.

Figure 7:
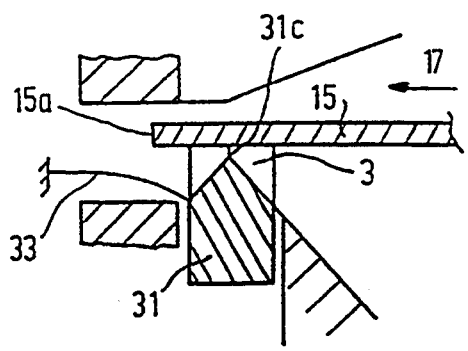
FIG. 7 shows the arrangement in a sectional view taken on the line VII—VII in FIG. 6.

In the situation shown in FIG. 7 and also in that shown in FIG. 6 a Compact Disc has been inserted partly and is consequently situated in the slot 3. It is apparent that the slide 31 is pressed down partly and the disc 15 does not contact the actuating edge 31c at the location where the sectional view is taken.

I claim:

1. An electrical information apparatus for scanning a rotatable information disc, having a disc surface and an information plane parallel to said surface, said apparatus having an operating space into and out of which the disc is movable, parallel to said information plane, through a slot bounding the operating space towards the exterior and having a longitudinal direction and a slot edge; and movable shutter means for closing said slot, characterized in that said shutter means are constructed as push-away segments which are movable perpendicularly to the plane of the disc and to the longitudinal direction of the slot, and have respective actuating edges, the slot edge and at least one of said actuating edges of the push-away segments being arranged and shaped in such a manner that, when the disc passes the push-away segments, only the area of the disc surface adjacent said disc edge comes into contact with the slot edge and the actuating edge of the push-away segments, during passage of the disc through said slot said push-away segments receding from other areas of said surface without contact with said other areas.

2. An electrical information apparatus as claimed in claim 1, characterized in that at least the slot edge and the actuating edge, between which actuating edge and the slot edge a disc edge can be inserted in an insertion direction parallel to said plane, each have a curved convex shape as viewed in said insertion direction.

3. An electrical information apparatus as claimed in claim 2, characterized in that the shutter means comprise swing-door type flaps which, viewed in the longitudinal direction of the slot, are pivotably supported at both sides of and outside the slot ends in such a manner that the edge portions of the disc, when they pass the slot during loading and unloading operations, pivot said flaps between a position in which the slot is open and a position in which said slot is closed.

4. An electrical information apparatus as claimed in claim 3, characterized in that the free ends of the flaps comprise means which interlock in the closed position.

5. An electrical information apparatus as claimed in claim 2, characterized in that the shutter means comprise a slide which is guided at least at both sides and outside the slot ends and which is movable transversely of the slot in such a manner the edge portions of the disc, when they pass the slot during loading and unloading operations, can move said slide between a position in which the slot is open and a position in which said slot is closed.

6. An electrical information apparatus as claimed in claim 5, characterized in that the shutter means are spring-loaded in the closing direction.

7. An electrical information apparatus as claimed in claim 5, characterized in that in the longitudinal direction the shutter means comprise actuating surfaces at the sides facing the slot, which surfaces converge to an actuating edge in order to achieve that disc edges push away the shutter means until they have come into contact with the actuating edge and, when the disc is moved further, only the actuating edges are still in contact with the disc edges and the shutter means are subsequently moved via the actuating edges.

8. An electrical information apparatus as claimed in claim 5, characterized in that the actuating edge of the slide is adapted to the downwardly curved shape of the lower edge of the slot between which edge and the actuating edges the disc edges are inserted.

9. An electrical information apparatus as claimed in claim 5, characterized in that the shutter means are guided transversely of the plane of insertion of the discs in guideways in the front part of a drive mechanism or apparatus, in which part the slot has been provided.

10. An electrical information apparatus as claimed in claim 1, characterized in that the shutter means comprise swing-door type flaps which, viewed in the longitudinal direction of the slot, are pivotably supported at both sides of and outside the slot ends in such a manner that the edge portions of the disc, when they pass the slot during loading and unloading operations, pivot said flaps between a position in which the slot is open and a position in which said slot is 11. An electrical information apparatus as claimed in claim 10, characterized in that the shutter means are spring-loaded in the closing direction.

12. An electrical information apparatus as claimed in claim 10, characterized in that in the longitudinal direction the shutter means comprise actuating surfaces at the sides facing the slot, which surfaces converge to an actuating edge in order to achieve that disc edges push away the shutter means until they have come into contact with the actuating edge and, when the disc is moved further, only the actuating edges are still in contact with the disc edges and the shutter means are subsequently moved via the actuating edges.

13. An electrical information apparatus as claimed in claim 10, characterized in that the free ends of the flaps comprise means which interlock in the closed position.

14. An electrical information apparatus as claimed in claim 10, characterized in that the shutter means are guided transversely of the plane of insertion of the discs in guideways in the front part of a drive mechanism or apparatus, in which part the slot has been provided.

15. An electrical information apparatus as claimed in claim 1, characterized in that the shutter means comprise a slide which is guided at least at both sides and outside the slot ends and which is movable transversely of the slot in such a manner that the edge portions of the disc, when they pass the slot during loading and unloading operations, can move said slide between a position in which the slot is open and a position in which said slot is closed.

16. An electrical information apparatus as claimed in claim 15, characterized in that the shutter means are spring-loaded in the closing direction.

17. An electrical information apparatus as claimed in claim 15, characterized in that in the longitudinal direction the shutter means comprise actuating surfaces at the sides facing the slot, which surfaces converge to an actuating edge in order to achieve that disc edges push away the shutter means until they have come into contact with the actuating edge and, when the disc is moved further, only the actuating edges are still in contact with the disc edges and the shutter means are subsequently moved via the actuating edges.

18. An electrical information apparatus as claimed in claim 15, characterized in that the actuating edge of the slide is adapted to the downwardly curved shape of the lower edge of the slot between which edge and the actuating edges the disc edges are inserted.

* * * * *